United States Patent
Kao et al.

(10) Patent No.: US 10,082,206 B2
(45) Date of Patent: Sep. 25, 2018

(54) CONTROL OF A CONTINUOUSLY VARIABLE TRANSMISSION USING FAST FOURIER TRANSFORMATION

(71) Applicant: GM GLOBAL TECHNOLOGY OPERATIONS LLC, Detroit, MI (US)

(72) Inventors: Chi-Kuan Kao, Troy, MI (US); Chunhao J. Lee, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 91 days.

(21) Appl. No.: 15/346,349

(22) Filed: Nov. 8, 2016

(65) Prior Publication Data

US 2017/0159813 A1 Jun. 8, 2017

Related U.S. Application Data

(60) Provisional application No. 62/264,459, filed on Dec. 8, 2015.

(51) Int. Cl.
*F16H 61/66* (2006.01)
*F16H 9/18* (2006.01)
(Continued)

(52) U.S. Cl.
CPC ......... *F16H 61/66259* (2013.01); *F16H 9/18* (2013.01); *F16H 59/68* (2013.01); *F16H 59/74* (2013.01); *F16H 2059/366* (2013.01)

(58) Field of Classification Search
CPC .. B60W 10/026; B60W 10/06; B60W 10/107; F16H 61/662; F16H 9/18
See application file for complete search history.

(56) References Cited

U.S. PATENT DOCUMENTS

| | | | |
|---|---|---|---|
| 7,174,246 B2 * | 2/2007 | Bitzer | F16D 48/06 701/51 |
| 8,977,447 B2 | 3/2015 | Sakagami | |

(Continued)

FOREIGN PATENT DOCUMENTS

| | | |
|---|---|---|
| CN | 1514916 A | 7/2004 |
| CN | 101206159 A | 6/2008 |

(Continued)

OTHER PUBLICATIONS

Ando, Yagaski, Ichijo, Sakagami, Sumida; "Improvement of Transmission Efficiency in CVT Shifting Mechanism Using metal Pushing V-Belt"; SAE International; published Apr. 14, 2015, doi: 10.4271/2015-01-1103.

*Primary Examiner* — Ramya P Burgess
*Assistant Examiner* — David R Morris
(74) *Attorney, Agent, or Firm* — Quinn IP Law

(57) ABSTRACT

A powertrain assembly includes a continuously variable transmission having a variator, an input member, an output member and a torque converter clutch. An input sensor configured to receive a signal from the input member. An output sensor is configured to receive a signal from the output member. The assembly includes a controller having a processor and tangible, non-transitory memory on which is recorded instructions for executing a method of controlling the continuously variable transmission. If the torque converter clutch is locked, the controller is programmed to obtain respective readings at predefined time intervals which are collected for the respective signals from the input sensor and the output sensor, until a predefined time window is reached. First and second fast Fourier transforms are obtained of the respective signals. The continuously variable transmission is controlled based at least partially on the first and second fast Fourier transforms.

15 Claims, 4 Drawing Sheets

(51) Int. Cl.
    *F16H 61/662*     (2006.01)
    *F16H 59/74*     (2006.01)
    *F16H 59/68*     (2006.01)
    *F16H 59/36*     (2006.01)

(56) References Cited

U.S. PATENT DOCUMENTS

| | | | |
|---|---|---|---|
| 9,285,031 B1* | 3/2016 | Otanez | F16H 61/66259 |
| 2004/0127331 A1* | 7/2004 | Sawada | F16H 1/66259 |
| | | | 477/44 |
| 2012/0290167 A1 | 11/2012 | Mordukhovich et al. | |
| 2012/0316016 A1* | 12/2012 | Sakagami | F16H 59/14 |
| | | | 474/11 |
| 2013/0325271 A1 | 12/2013 | Lister et al. | |

FOREIGN PATENT DOCUMENTS

| | | |
|---|---|---|
| CN | 101813031 A | 8/2010 |
| CN | 101975634 A | 2/2011 |
| CN | 102072064 A | 5/2011 |
| CN | 102748181 A | 10/2012 |
| WO | 2014071104 A1 | 5/2014 |

\* cited by examiner

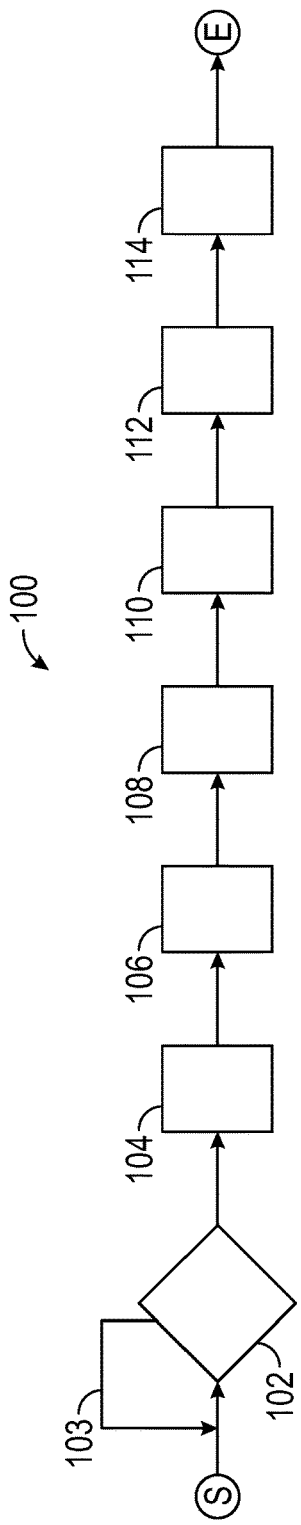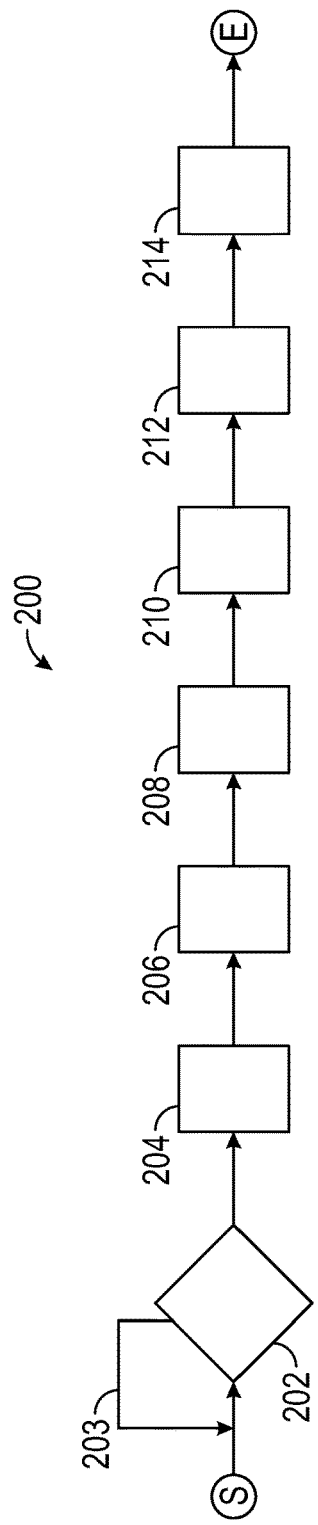
FIG. 2A
FIG. 2B

CONTROL OF A CONTINUOUSLY VARIABLE TRANSMISSION USING FAST FOURIER TRANSFORMATION

CROSS-REFERENCE TO RELATED APPLICATIONS

This application claims the benefit of U.S. Provisional Patent Application No. 62/264,459 filed on Dec. 8, 2015, the disclosure of which is hereby incorporated by reference.

INTRODUCTION

The disclosure relates generally to control of a continuously variable transmission, and more specifically, to control of a continuously variable transmission using fast Fourier transforms. Powertrains having an internal combustion engine coupled to a continuously variable transmission (CVT) may be employed to provide tractive effort in a vehicle. A continuously variable transmission is capable of operating at input/output speed ratios that are variable over a range between a minimum and a maximum ratio, in response to an output torque request.

SUMMARY

A powertrain assembly includes a continuously variable transmission having a variator, an input member and an output member. A torque converter clutch is operatively connected to the continuously variable transmission. An input sensor is configured to receive a signal from the input member. An output sensor is configured to receive a signal from the output member. The variator includes a first pulley, a second pulley and a flexible continuous rotatable device. The first and second pulleys are rotatably coupled by the flexible continuous rotatable device. The input member is rotatably coupled to the first pulley and the output member is rotatably coupled to the second pulley.

The assembly includes a controller having a processor and tangible, non-transitory memory on which is recorded instructions for executing a method of controlling the continuously variable transmission. Execution of the instructions by the processor causes the controller to determine if the torque converter clutch is locked. If the torque converter clutch is locked, respective readings at predefined time intervals are collected for the respective signals from the input sensor and the output sensor, until a predefined time window is reached. A first fast Fourier transform is obtained of the respective signal from the input sensor and a second fast Fourier transform of the respective signal from the output sensor during the predefined time window. The continuously variable transmission is controlled based at least partially on the first fast Fourier transform and the second fast Fourier transform.

An engine is operatively connected to the continuously variable transmission. An engine speed sensor is configured to obtain a rotational speed of the engine. The controller is further programmed to collect engine speed readings at the predefined time interval from the engine speed sensor until the predefined time window is reached; and obtain a third fast Fourier transform of the engine speed readings during the predefined fixed time window.

A calculated engine firing frequency ($EFF_c$) is obtained as a product of an average engine speed during the predefined time window and a factor, wherein the factor is a number of cylinders in the engine divided by two ($n_{cyl}/2$). A dominating engine firing frequency ($EFF_d$) is obtained from the third fast Fourier transform of the respective signal from the engine speed sensor, the dominating engine firing frequency ($EFF_d$) being a relative maximum amplitude within a predefined range of the calculated engine firing frequency ($EFF_c$).

The controller is programmed to obtain an input amplitude ($A_{R\_input}$) and an input phase ($\varphi_{R\_input}$) at a reference frequency from the first fast Fourier transform, the reference frequency being the dominating engine firing frequency ($EFF_d$). An output amplitude ($A_{R\_input}$) and an output phase ($\varphi_{R\_input}$) at a reference frequency is obtained from the second fast Fourier transform. Application of a first clamping pressure causes motion of the first pulley and application of a second clamping force causes motion of the second pulley. The controller is programmed to: obtain an amplitude ratio ($A_{R\_output}/A_{R\_input}$) based at least partially on the first and second fast Fourier transforms. One or both of the first and second clamping pressures may be adjusted based at least partially on the amplitude ratio ($A_{R\_output}/A_{R\_input}$).

The controller is programmed to obtain a phase difference ($|\varphi_{R\_input}-\varphi_{R\_output}|$) based at least partially on the first and second fast Fourier transforms. One or both of the first and second clamping pressures are adjusted based at least partially on the phase difference ($|\varphi_{R\_input}-\varphi_{R\_output}|$).

The controller is programmed to calculate a calculated engine firing frequency ($EFF_c$) as a product of an average engine speed during the predefined time window and a factor, wherein the factor is a number of cylinders in the engine divided by two ($n_{cyl}/2$). A dominating engine firing frequency ($EFF_d$) is obtained from the first fast Fourier transform of the respective signal from the input sensor, the dominating engine firing frequency ($EFF_d$) being a relative maximum amplitude within a predefined range of the calculated engine firing frequency ($EFF_c$).

The above features and advantages and other features and advantages of the present disclosure are readily apparent from the following detailed description of the best modes for carrying out the disclosure when taken in connection with the accompanying drawings.

BRIEF DESCRIPTION OF THE DRAWINGS

FIG. 2A is a flowchart for a method for controlling the continuously variable transmission of FIG. 1, in accordance with a first embodiment;

FIG. 2B is a flowchart for a method for controlling the continuously variable transmission of FIG. 1, in accordance with a second embodiment;

DETAILED DESCRIPTION

Figure 1:
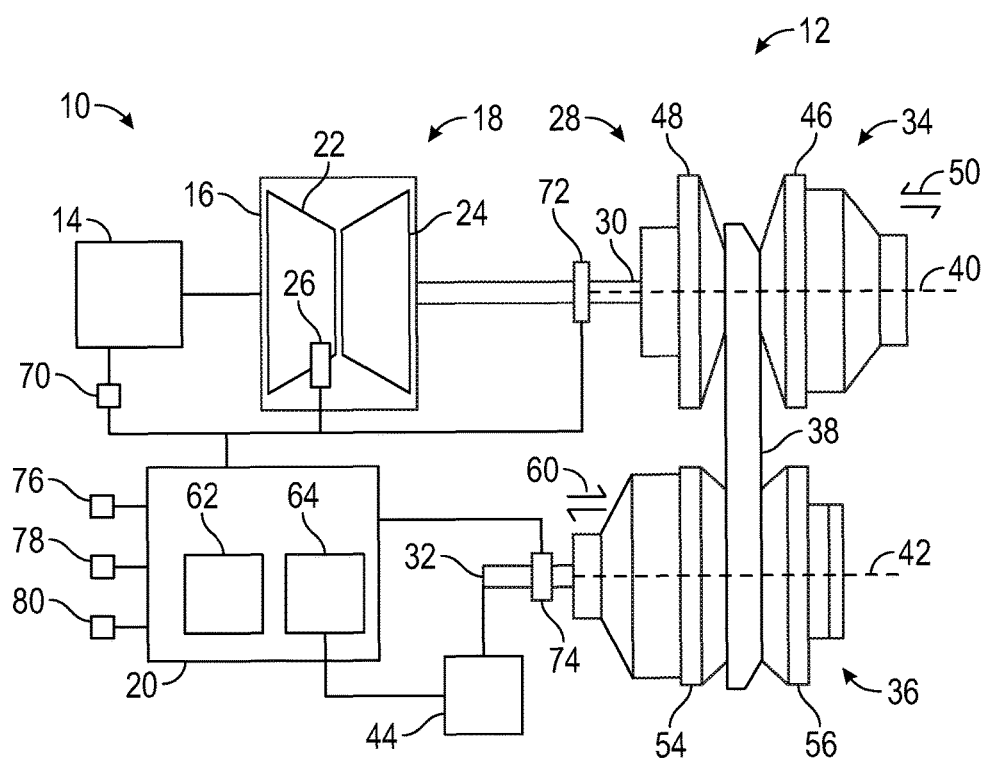
FIG. 1 is a schematic fragmentary view of a powertrain assembly having a continuously variable transmission, an input sensor, an output sensor, an engine speed sensor and a controller.

Referring to the drawings, wherein like reference numbers refer to like components, FIG. 1 schematically illustrates a powertrain assembly 10 that includes a continuously variable transmission 12. An engine 14 may be operatively connected to the continuously variable transmission 12 via a torque converter 16. The powertrain assembly 10 may be part of a device 18, which may be a vehicle, a bicycle, a robot, farm implement, sports-related equipment or other transportation device. Operation of the powertrain assembly 10 is monitored by and controlled by a controller 20 in response to driver commands and other factors. The controller 20 of FIG. 1 may be an integral portion of, or a separate module operatively connected to, other controllers of the device 18. The device 18 may take many different forms and include multiple and/or alternate components and facilities.

The engine 14 may be an internal combustion engine capable of transforming hydrocarbon fuel to mechanical power to generate torque in response to commands originating from the controller 20. The torque converter 16 provides fluidic coupling for transferring torque. The torque converter 16 may include a pump 22, a turbine 24, and a torque converter clutch 26 that locks rotation of the pump 22 and turbine 24. Engagement of torque converter clutch 26 is controllable by the controller 20.

Referring to FIG. 1, the continuously variable transmission 12 includes a variator 28, an input member 30 and an output member 32. The variator 28 is configured to transfer torque between the input member 30 and the output member 32. The variator 28 includes a primary or first pulley 34, a secondary or second pulley 36 and a flexible continuously rotatable device 38 that rotatably couples the first and second pulleys 34, 36 to transfer torque therebetween. The first pulley 34 rotatably attaches to the input member 30 and the second pulley 36 rotatably attaches to the output member 32, and the rotatable device 38 is adapted to transfer torque between the first and second pulleys 34, 36 and thus between the input and output members 30, 32. The first pulley 34 and input member 30 may rotate about a first axis 40, and the second pulley 36 and output member 32 may rotate about a second axis 42. The continuous rotatable device 38 can be a belt, a chain, or another suitable flexible continuous device. In one embodiment, the continuous rotatable device 38 is made of metal. The output torque may be transferred from the output member 32 to wheels (not shown) of the device 18 via a driveline 44.

Referring to FIG. 1, the first pulley 34 may include a first moveable sheave 46 and a first stationary sheave 48. In response to a first clamping pressure 50, the first moveable sheave 46 may translate along the first axis 40 relative to the first stationary sheave 48. The first stationary sheave 48 may be axially fixed to the input member 30 along the first axis 40. Referring to FIG. 1, the second pulley 36 may include a second moveable sheave 54 and a second stationary sheave 56. In response to a second clamping pressure 60, the second moveable sheave 54 may translate along the second axis 42 relative to the stationary sheave 56. The second stationary sheave 56 may be axially fixed relative to the output member 32 along the second axis 42.

Lowering one or both of the first and second clamping pressures 50, 60 results in increased efficiency in the transfer of torque. However, setting one or both of the first and second clamping pressures 50, 60 too low may result in macro-slip (macro-belt slip) conditions which can result in shortened, or damaged, belt or pulley life.

Referring to FIG. 1, the controller 20 includes at least one processor 62 and at least one memory 64 (or non-transitory, tangible computer readable storage medium) on which are recorded instructions for executing methods 100 and/or 200, shown in FIGS. 2A and 2B, respectively, for controlling the continuously variable transmission. The memory 64 can store controller-executable instruction sets, and the processor 62 can execute the controller-executable instruction sets stored in the memory 64. The controller 20 may control the continuously variable transmission 12 to achieve a desired speed ratio by controlling the pressures of one or both the primary pulley 34 and the secondary pulley 36, i.e., one or both of the first and second clamping pressures 50, 60. The desired speed ratio indicates a commanded, future value for the speed ratio, which may be determined based upon monitored and estimated operating conditions related to an output power command, vehicle speed, engine torque, and other factors.

The controller 20 of FIG. 1 is specifically programmed to execute the steps of the methods 100 and 200 (as discussed in detail below with respect to FIGS. 2A, 2B) and can receive inputs from various sensors. For example, the powertrain assembly 10 may include an engine speed sensor 70 in communication (e.g., electronic communication) with the controller 20 and adapted to measure the engine speed of the engine 14. Referring to FIG. 1, an input sensor 72 may be adapted to receive a signal from the input member 30. In one embodiment, the signal received by the input sensor 72 is the rotational speed of the input member 30, which relates to a speed of the first pulley 34. In another embodiment, the signal received by the input sensor 72 is the torque of the input member 30. An output sensor 74 may be adapted to receive a signal from the output member 32. In one embodiment, the signal received by the output sensor 74 is the rotational speed of the output member 32, which relates to a speed of the second pulley 36. In another embodiment, the signal received by the output sensor 74 is the torque of the output member 32.

Referring now to FIG. 2A, a flowchart of the method 100 stored on and executable by the controller 20 of FIG. 1 is shown. Method 100 need not be applied in the specific order recited herein. Furthermore, it is to be understood that some steps may be eliminated. Referring to FIG. 2A, method 100 may begin with block 102, where the controller 20 is programmed or configured to determine if the torque converter clutch 26 is locked. In another embodiment, in block 102, the controller 20 may be programmed to determine if a starting clutch or other starting device is locked. The device 18 may employ a schedule or table of torque converter clutch engagement or disengagement, depending on speed of the device 18 (obtained via a device or vehicle speed sensor 76) and accelerator pedal position sensor 78 or throttle position sensor 80. The torque converter clutch 26 may be engaged after launch of the device 18 and disengaged during accelerator pedal tip-in or relatively low speed (for a continuously variable transmission 12). If the torque converter clutch 26, starting clutch or other starting device is locked, the method 100 proceeds to block 104. If not, the method 100 proceeds back to the start, as shown by line 103.

In block 104 of FIG. 2A, the controller 20 is programmed to collect readings at a predefined time interval for the respective signals from the input sensor 72 and output sensor 74 until a predefined time window is reached. In one embodiment, the predefined time interval is 5 milliseconds and the predefined time window is 0.5 seconds. The signal data may be transferred to the controller 20 via internal I/O processer or the CAN communication protocol or other tap-in method, or other method employed by those skilled in the art.

In block 106 of FIG. 2A, the controller 20 is programmed to compute respective fast Fourier transforms (FFT) for the respective signals from the input sensor 72 and the output sensor 74, collected in block 104, for the predefined time window. In this embodiment, the respective signals received by the input and output sensors 72, 74 are the respective rotational speeds of the input and output members 30, 32. However, the methods 100 and 200 can be applied to torque signals received by the input and output sensors, 30, 32. A fast Fourier transform routine available to those skilled in the art may be employed, including but not limited to Hilbert transform and products from Simulink, Matlab etc. Fourier analysis converts a signal from its original domain, such as time, to a representation in the frequency domain and vice versa. As is understood, fast Fourier transform routines rapidly compute such transforms by computing the discrete Fourier transform (DFT) of a sequence, or its inverse, and factorizing the DFT matrix into a product of sparse factors.

Figure 3:
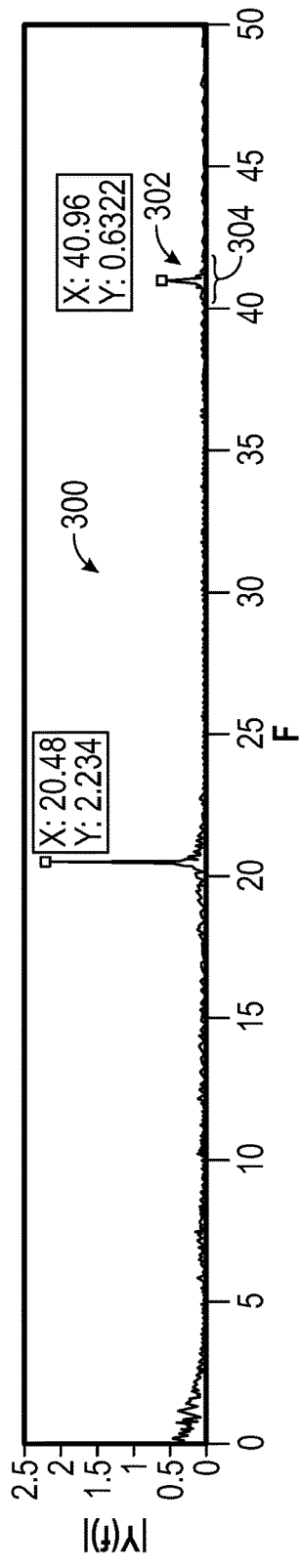
FIG. 3 is an example of a first fast Fourier transformed signal for the input sensor of FIG. 1, showing amplitude versus frequency (in Hertz)
Figure 4:
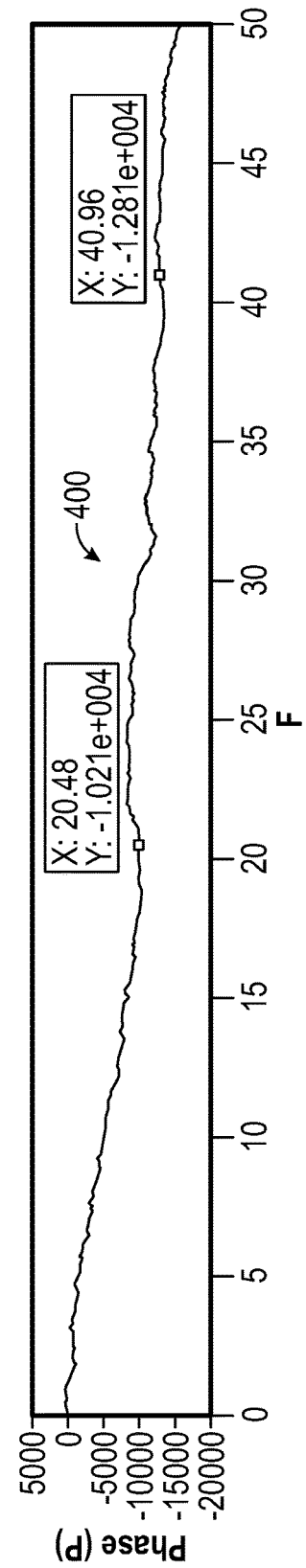
FIG. 4 is an example of the first fast Fourier transformed signal for the input sensor of FIG. 1, showing phase (in degrees) versus frequency (in Hertz)
Figure 5:
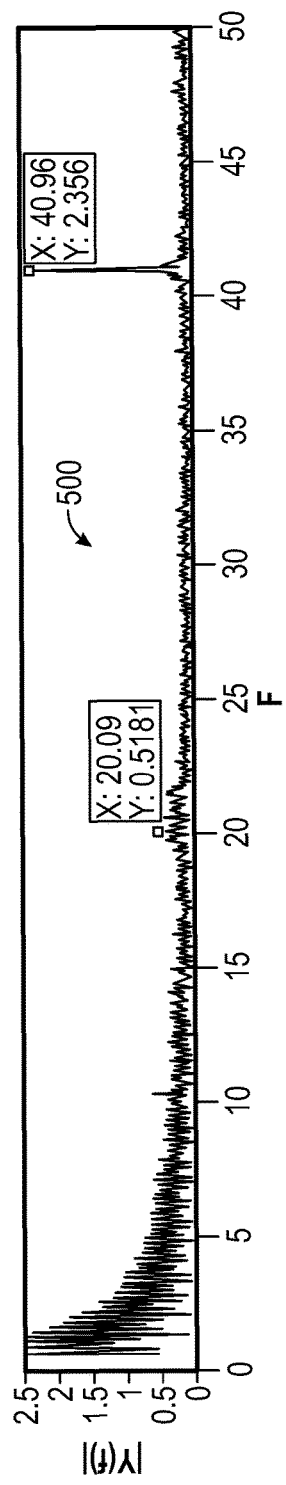
FIG. 5 is an example of a second fast Fourier transformed signal for the output sensor of FIG. 1, showing amplitude versus frequency (in Hertz)
Figure 6:
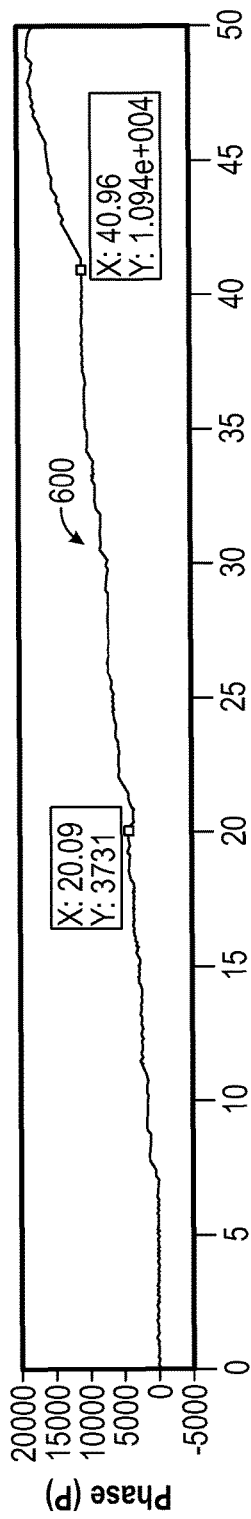
FIG. 6 is an example of the second fast Fourier transformed signal for the output sensor of FIG. 1, showing phase (in degrees) versus frequency (in Hertz)

The data that fast Fourier transform returns is represented in terms of the amplitude (i.e. magnitude) and phase of a given frequency bin. Each of the x-axes in FIGS. 3-7, respectively, show frequency (F) in Hertz. FIGS. 3-4 are examples of an input speed or first fast Fourier transformed signal 300 for the input sensor 72 of FIG. 1. FIG. 3 shows amplitude versus frequency while FIG. 4 shows phase P (in degrees) versus frequency. FIGS. 5-6 are examples of an output speed or second fast Fourier transformed signal 500 for the output sensor 74 of FIG. 1. FIG. 5 shows amplitude versus frequency while FIG. 6 shows phase P (in degrees) versus frequency.

In block 108 of FIG. 2A, the controller 20 is programmed to obtain a calculated engine firing frequency ($EFF_c$), as a product of an average engine speed (during the fixed time window) and a factor, wherein the factor is a number of cylinders in the engine divided by two ($n_{cyl}/2$). The average engine speed (during the fixed time window) may be obtained via the engine speed sensor 70 or the input sensor 72. In the embodiment shown, the average engine speed is 1230 rpm, which is 20.5 Hz. If the number of cylinders is 4, the calculated engine firing frequency ($EFF_c$) is 41 Hz (20.5*4/2). However it is to be appreciated that the number of cylinders and the average engine speed may be varied according to the application at hand.

In block 110 of FIG. 2A, the controller 20 is programmed to obtain a dominating engine firing frequency ($EFF_d$) from the fast Fourier transformed signal 300 for the input sensor 72 (see FIG. 3) as a relative maximum amplitude 302 (or peak) within a predefined range 304 of the calculated engine firing frequency ($EFF_c$). In one example, the predefined range may be 5%. Thus, if the calculated engine firing frequency ($EFF_c$). is 41 Hz, the controller may be programmed to look for a relative maximum within 41±2 Hz. In the embodiment shown, the dominating engine firing frequency ($EFF_d$) is found to be 40.96 Hz.

In block 112 of FIG. 2A, the controller 20 is programmed to find the amplitude ($A_{R\_input}$) and phase ($\varphi_{R\_input}$) at a reference frequency for the fast Fourier transformed signal 300 and 400 of the input sensor 72. The controller 20 is programmed to find the amplitude ($A_{R\_output}$) and phase ($\varphi_{R\_output}$) at a reference frequency for the fast Fourier transformed signal 500 and 600 of the output sensor 74. In the embodiment shown, the dominating engine firing frequency ($EFF_d$), obtained in block 110, may be set as the reference frequency. It is to be understood that the reference frequency may be variably selected for the application.

In block 114 of FIG. 2A, the controller 20 may be programmed to adjust one or both of the first and second clamping pressures based at least partially on one or both of an amplitude ratio ($A_{R\_output}/A_{R\_input}$) and a phase difference ($|\varphi_{R\_input}-\varphi_{R\_output}|$). The amplitude ratio ($A_{R\_output}/A_{R\_input}$) and phase difference ($|\varphi_{R\_input}-\varphi_{R\_output}|$) are based on the information obtained in block 112. In one example, the controller 20 is programmed to adjust one or both of the first and second clamping pressures based at least partially on the phase difference ($|\varphi_{R\_input}-\varphi_{R\_output}|$) and a first look-up table. The first look-up table may be created in test cell or laboratory conditions and includes clamp pressure values at various phase difference. In another example, the controller 20 is programmed to adjust one or both of the first and second clamping pressures based at least partially on the amplitude ratio ($A_{R\_output}/A_{R\_input}$) and a second look-up table. The second look-up table may be created in test cell or laboratory conditions and includes clamp pressure values at various amplitude ratios.

Second Embodiment

Referring now to FIG. 2B, a flowchart of the method 200 stored on and executable by the controller 20 of FIG. 1 is shown. The second embodiment is similar to the first embodiment, except as described below. Method 200 need not be applied in the specific order recited herein. Furthermore, it is to be understood that some steps may be eliminated. Referring to FIG. 2B, method 200 may begin with block 202, where the controller 20 is programmed or configured to determine if the torque converter clutch 26 is locked. The device 18 may employ a schedule or table of torque converter clutch engagement or disengagement, depending on speed of the device 18 (obtained via a device or vehicle speed sensor 76) and accelerator pedal position sensor 78 or throttle position sensor 80. The torque converter clutch 26 may be engaged after launch of the device 18 and disengaged during accelerator pedal tip-in or relatively low speed (for a continuously variable transmission 12). If the torque converter clutch 26 is locked, the method 200 proceeds to block 204. If not, the method 200 proceeds back to the start, as shown by line 203.

In block 204 of FIG. 2B, the controller 20 is programmed to collect readings at a predefined time interval for the signal from the engine speed sensor 70, in addition to collecting the respective signals from the input sensor 72 and output sensor 74.

Figure 7:
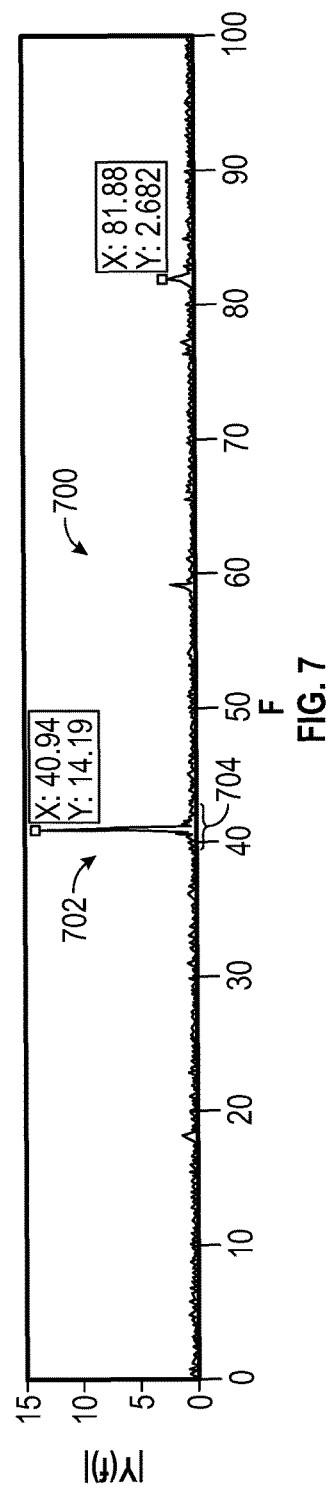
FIG. 7 is an example of a third fast Fourier transformed signal for the engine speed sensor of FIG. 1, showing amplitude versus frequency (in Hertz).

In block 206 of FIG. 2B, the controller 20 is programmed to compute respective fast Fourier transforms (FFT) for the signal data from the engine speed sensor 70, in addition to the input sensor 72 and output sensor 74, collected in block 204, for the predefined time window. FIG. 7 is an example of a third Fourier transformed signal 700 for the engine speed sensor 70, showing amplitude versus frequency.

As noted above with respect to the first embodiment, FIG. 3 is an example of a first fast Fourier transformed signal 300 for the input sensor 72 of FIG. 1, showing amplitude versus frequency. FIG. 4 is an example of an input speed fast Fourier transformed signal 400 for the input sensor 72 of FIG. 1, showing phase versus frequency. FIG. 5 is an example of an output speed fast Fourier transformed signal 500 for the output sensor 74 of FIG. 1, showing amplitude versus frequency. FIG. 6 is an example of an output speed fast Fourier transformed signal 600 for the output sensor 74 of FIG. 1, showing phase versus frequency. In the first embodiment, collecting data from the engine speed sensor 70 was not required.

As in the first embodiment, in block 208 of FIG. 2B, the controller 20 is programmed to obtain a calculated engine firing frequency ($EFF_c$), as a product of an average engine speed and a factor, wherein the factor is a number of cylinders in the engine divided by two ($n_{cyl}/2$).

In block 210 of FIG. 2B, the controller 20 is programmed to obtain a dominating engine firing frequency ($EFF_d$) from the engine speed fast Fourier transformed signal 700 (example shown in FIG. 7) as a relative maximum amplitude 702 (or peak) within a predefined range 704 of the calculated engine firing frequency ($EFF_c$). In the first embodiment, the input speed fast Fourier transformed signal 300 was used to obtain the dominating engine firing frequency ($EFF_d$).

As in the first embodiment, in block 212 of FIG. 2B, the controller 20 is programmed to find the amplitude ($A_{R\_input}$) and phase ($\varphi_{R\_input}$) at a reference frequency for the fast Fourier transformed signal of the input sensor 72. Additionally, the controller 20 is programmed to find the amplitude ($A_{R\_output}$) and phase ($\varphi_{R\_output}$) at a reference frequency for the fast Fourier transformed signal of the output sensor 74. In the embodiment shown, the reference frequency is the dominating engine firing frequency ($EFF_d$) obtained in block 210. This relative maximum 702 is set as the reference frequency.

As in the first embodiment, in block 214 of FIG. 2A, the controller 20 may be programmed to adjust one or both of the first and second clamping pressures 50, 60 based at least partially on one or both of an amplitude ratio ($A_{R\_output}/A_{R\_input}$) and a phase difference ($|\varphi_{R\_input} - \varphi_{R\_output}|$), obtained from the information in block 212. The controller 20 (and execution of the method 100 or method 200) improves the functioning of the device 18 by enabling precise control of the speed ratio and torque output of a complex system with minimal calibration required.

The controller 20 includes a computer-readable medium (also referred to as a processor-readable medium), including a non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which may constitute a main memory. Such instructions may be transmitted by one or more transmission media, including coaxial cables, copper wire and fiber optics, including the wires that comprise a system bus coupled to a processor of a computer. Some forms of computer-readable media include, for example, a floppy disk, a flexible disk, hard disk, magnetic tape, other magnetic medium, a CD-ROM, DVD, other optical medium, punch cards, paper tape, other physical medium with patterns of holes, a RAM, a PROM, an EPROM, a FLASH-EEPROM, other memory chip or cartridge, or other medium from which a computer can read.

Look-up tables, databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store may be included within a computing device employing a computer operating system such as one of those mentioned above, and may be accessed via a network in one or more of a variety of manners. A file system may be accessible from a computer operating system, and may include files stored in various formats. An RDBMS may employ the Structured Query Language (SQL) in addition to a language for creating, storing, editing, and executing stored procedures, such as the PL/SQL language mentioned above.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

What is claimed is:

1. A powertrain assembly comprising:
a continuously variable transmission having a variator, an input member and an output member;
a torque converter clutch operatively connected to the continuously variable transmission;
an input sensor configured to receive a respective signal from the input member;
an output sensor configured to receive a respective signal from the output member;
wherein the variator includes a first pulley, a second pulley and a flexible continuous rotatable device, the first and second pulleys being rotatably coupled by the flexible continuous rotatable device;
wherein the input member is rotatably coupled to the first pulley and the output member is rotatably coupled to the second pulley;
a controller including a processor and tangible, non-transitory memory on which is recorded instructions for executing a method of controlling the continuously variable transmission, execution of the instructions by the processor causing the controller to:
determine if the torque converter clutch is locked;
if the torque converter clutch is locked, then collect respective readings at predefined time intervals for the respective signals from the input sensor and the output sensor, until a predefined time window is reached;
obtain a first fast Fourier transform of the respective signal from the input sensor and a second fast Fourier transform of the respective signal from the output sensor during the predefined time window; and
control the continuously variable transmission based at least partially on the first fast Fourier transform and the second fast Fourier transform.

2. The assembly of claim 1, further comprising:
an engine operatively connected to the continuously variable transmission;
an engine speed sensor configured to obtain a rotational speed of the engine; and wherein the controller is further programmed to:
    collect engine speed readings at the predefined time interval from the engine speed sensor until the predefined time window is reached; and
    obtain a third fast Fourier transform of the engine speed readings during the predefined time window.

3. The assembly of claim 2, wherein the controller is programmed to:
    calculate a calculated engine firing frequency (EFF$_c$) as a product of an average engine speed during the predefined time window and a factor, wherein the factor is a number of cylinders in the engine divided by two (n$_{cyl}$/2); and
    obtain a dominating engine firing frequency (EFF$_d$) from the first fast Fourier transform of the respective signal from the input sensor, the dominating engine firing frequency (EFF$_d$) being a relative maximum within a predefined range of the calculated engine firing frequency (EFF$_c$).

4. The assembly of claim 1, wherein the controller is programmed to:
    calculate a calculated engine firing frequency (EFF$_c$) as a product of an average engine speed during the predefined time window and a factor, wherein the factor is a number of cylinders in the engine divided by two (n$_{cyl}$/2); and
    obtain a dominating engine firing frequency (EFF$_d$) from the third fast Fourier transform of the respective signal from the engine speed sensor, the dominating engine firing frequency (EFF$_d$) being a relative maximum amplitude within a predefined range of the calculated engine firing frequency (EFF$_c$).

5. The assembly of claim 4, wherein the controller is programmed to:
    obtain an input amplitude (A$_{R\_input}$) and an input phase ($\varphi_{R\_input}$) at a reference frequency from the first fast Fourier transform, the reference frequency being the dominating engine firing frequency (EFF$_d$); and
    obtain an output amplitude (A$_{R\_output}$) and an output phase ($\varphi_{R\_output}$) at a reference frequency from the second fast Fourier transform.

6. The assembly of claim 3:
    wherein application of a first clamping pressure causes motion of the first pulley and application of a second clamping pressure causes motion of the second pulley;
    wherein the controller is programmed to:
        obtain an amplitude ratio (A$_{R\_output}$/A$_{R\_input}$) based at least partially on the first and second fast Fourier transforms; and
        adjust one or both of the first and second clamping pressures based at least partially on the amplitude ratio (A$_{R\_output}$/A$_{R\_input}$).

7. The assembly of claim 5:
    wherein application of a first clamping pressure causes motion of the first pulley and application of a second clamping pressure causes motion of the second pulley;
    wherein the controller is programmed to:
        obtain a phase difference (|$\varphi_{R\_input}$−$\varphi_{R\_output}$|) based at least partially on the first and second fast Fourier transforms; and
        adjust one or both of the first and second clamping pressures based at least partially on the phase difference (|$\varphi_{R\_input}$−$\varphi_{R\_output}$|).

8. A method of controlling a continuously variable transmission in a powertrain assembly, the continuously variable transmission having a variator, an input member and an output member, the powertrain assembly having a controller, a torque converter clutch, an input sensor configured to receive a respective signal from the input member, and an output sensor configured to receive a respective signal from the output member, the method comprising:
    determining if the torque converter clutch is locked;
    if the torque converter clutch is locked, then collecting respective readings at predefined time intervals for the respective signals from the input sensor and the output sensor, until a predefined time window is reached;
    obtaining a first fast Fourier transform of the respective signal from the input sensor and a second fast Fourier transform of the respective signal from the output sensor during the predefined time window; and
    controlling the continuously variable transmission based at least partially on the first fast Fourier transform and the second fast Fourier transform.

9. The method of claim 8, wherein the powertrain assembly includes an engine and an engine speed sensor configured to obtain a rotational speed of the engine, the method further comprising:
    collecting engine speed readings at the predefined time interval from the engine speed sensor until the predefined time window is reached; and
    obtaining a third fast Fourier transform of the engine speed readings during the predefined time window.

10. The method of claim 9, further comprising:
    calculating a calculated engine firing frequency (EFF$_c$) as a product of an average engine speed during the predefined time window and a factor, wherein the factor is a number of cylinders in the engine divided by two (n$_{cyl}$/2); and
    obtaining a dominating engine firing frequency (EFF$_d$) from the first fast Fourier transform of the respective signal from the input sensor, the dominating engine firing frequency (EFF$_d$) being a relative maximum amplitude within a predefined range of the calculated engine firing frequency (EFF$_c$).

11. The method of claim 8, further comprising:
    calculating a calculated engine firing frequency (EFF$_c$) as a product of an average engine speed during the predefined time window and a factor, wherein the factor is a number of cylinders in the engine divided by two (n$_{cyl}$/2); and
    obtaining a dominating engine firing frequency (EFF$_d$) from the third fast Fourier transform of the respective signal from the engine speed sensor, the dominating engine firing frequency (EFF$_d$) being a relative maximum amplitude within a predefined range of the calculated engine firing frequency (EFF$_c$).

12. The method of claim 11, further comprising:
    obtaining an input amplitude (A$_{R\_input}$) and an input phase ($\varphi_{R\_input}$) at a reference frequency from the first fast Fourier transform, the reference frequency being the dominating engine firing frequency (EFF$_d$); and
    obtaining an output amplitude (A$_{R\_output}$) and an output phase ($\varphi_{R\_output}$) at a reference frequency from the second fast Fourier transform.

13. The method of claim 12, wherein the variator includes a first pulley, a second pulley and a flexible continuous rotatable device, the method further comprising:
    obtaining an amplitude ratio (A$_{R\_output}$/A$_{R\_input}$) based at least partially on the first and second fast Fourier transforms;
    applying a first clamping pressure to cause motion of the first pulley and applying a second clamping pressure to cause motion of the second pulley; and adjusting one or both of the first and second clamping pressures based at least partially on the amplitude ratio ($A_{R\_output}/A_{R\_input}$).

14. The method of claim 13, further comprising:

obtaining a phase difference ($|\varphi_{R\_input}-\varphi_{R\_output}|$) based at least partially on the first and second fast Fourier transforms; and adjusting one or both of the first and second clamping pressures based at least partially on the phase difference ($|\varphi_{R\_input}-\varphi_{R\_output}|$).

15. A powertrain assembly comprising:

a continuously variable transmission having a variator, an input member and an output member;

a torque converter clutch operatively connected to the continuously variable transmission;

an input sensor configured to receive a respective signal from the input member;

an output sensor configured to receive a respective signal from the output member;

wherein the variator includes a first pulley, a second pulley and a flexible continuous rotatable device, the first and second pulleys being rotatably coupled by the flexible continuous rotatable device;

wherein the input member is rotatably coupled to the first pulley and the output member is rotatably coupled to the second pulley;

wherein application of a first clamping pressure causes motion of the first pulley and application of a second clamping pressure causes motion of the second pulley;

an engine operatively connected to the continuously variable transmission and an engine speed sensor configured to obtain a rotational speed of the engine;

a controller including a processor and tangible, non-transitory memory on which is recorded instructions for executing a method of controlling the continuously variable transmission, execution of the instructions by the processor causing the controller to:

determine if the torque converter clutch is locked;

if the torque converter clutch is locked, then collect respective readings at predefined time intervals for the respective signals from the input sensor and the output sensor, until a predefined time window is reached;

obtain a first fast Fourier transform of the respective signal from the input sensor and a second fast Fourier transform of the respective signal from the output sensor during the predefined time window;

collect engine speed readings at the predefined time interval from the engine speed sensor until the predefined time window is reached;

obtain a third fast Fourier transform of the engine speed readings during the predefined time window;

obtain an amplitude ratio ($A_{R\_output}/A_{R\_input}$) based at least partially on the first and second fast Fourier transforms;

obtain a phase difference ($|\varphi_{R\_input}-\varphi_{R\_output}|$) based at least partially on the first and second fast Fourier transforms; and adjust one or both of the first and second clamping pressures based at least partially on the amplitude ratio ($A_{R\_output}/A_{R\_input}$) and the phase difference ($|\varphi_{R\_input}-\varphi_{R\_output}|$).

* * * * *